United States Patent
Rogers

[19]

[11] Patent Number: 5,887,315
[45] Date of Patent: Mar. 30, 1999

[54] HANDLE ASSEMBLY FOR FLOOR SUPPORTED APPLIANCES

[75] Inventor: Carla B. Rogers, Kingsport, Tenn.

[73] Assignee: Electrolux LLC, Dallas, Tex.

[21] Appl. No.: 815,218

[22] Filed: Mar. 12, 1997

[51] Int. Cl.$^6$ .............................. A47L 9/24; B29D 22/00; B29C 49/06; B25G 1/00

[52] U.S. Cl. ................... 16/125; 16/110 R; 16/DIG. 12; 16/DIG. 19; 16/DIG. 42; 16/DIG. 41; 264/572; 15/410

[58] Field of Search ........................ 264/572; 16/110 R, 16/111 R, 114 R, DIG. 12, DIG. 42, 119, 125; 30/276, 272.1, 277.4; 15/344, 361, 410; 74/543, 523; D7/646

[56] References Cited

U.S. PATENT DOCUMENTS

| | | | |
|---|---|---|---|
| D. 286,491 | 11/1986 | Levin ........................................ | D7/646 |
| D. 289,963 | 5/1987 | Thomas ..................................... | D7/646 |
| D. 294,988 | 3/1988 | Goodrich ................................. | D32/34 |
| D. 314,691 | 2/1991 | Gebhardt ................................... | D7/646 |
| D. 393,514 | 4/1998 | Hadley et al. ......................... | 16/114 R |
| 3,188,681 | 6/1965 | Jepson et al. ............................. | 15/337 |
| 3,193,992 | 7/1965 | Findley et al. ............................ | 55/367 |
| 3,316,636 | 5/1967 | Raper, Jr. et al. ..................... | 30/277.4 |
| 3,608,333 | 9/1971 | Selley et al. ................................ | 64/4 |
| 3,667,084 | 6/1972 | Valbona et al. ........................... | 15/410 |
| 3,949,817 | 4/1976 | Rice ...................................... | 16/111 R |
| 4,171,553 | 10/1979 | Stein ........................................ | 15/350 |
| 4,360,971 | 11/1982 | Fellmann ................................. | 30/276 |
| 4,517,705 | 5/1985 | Hug ............................................ | 15/351 |
| 4,656,566 | 4/1987 | Kelley ................................... | 16/110 R |
| 4,660,246 | 4/1987 | Duncan et al. ........................... | 15/329 |
| 4,707,169 | 11/1987 | Wareham et al. ......................... | 55/357 |
| 4,709,440 | 12/1987 | Conelly .................................... | 15/257 |
| 4,715,084 | 12/1987 | Jacob et al. .............................. | 15/328 |
| 4,720,890 | 1/1988 | Jacob ....................................... | 15/323 |
| 4,724,574 | 2/1988 | Bowerman et al. ....................... | 15/351 |
| 4,881,425 | 11/1989 | Kanno ..................................... | 74/543 |
| 4,909,096 | 3/1990 | Kobayashi ............................... | 74/543 |
| 4,915,640 | 4/1990 | Hayden .................................... | 15/410 |
| 5,016,315 | 5/1991 | Bledsoe et al. ........................... | 15/410 |
| 5,118,080 | 6/1992 | Hartmann ................................. | 74/523 |
| 5,289,735 | 3/1994 | Kato et al. ............................... | 74/543 |
| 5,501,120 | 3/1996 | Kikuchi et al. ......................... | 264/572 |
| 5,560,108 | 10/1996 | Wilson ..................................... | 30/276 |
| 5,622,298 | 4/1997 | Cucheran et al. ...................... | 264/572 |

FOREIGN PATENT DOCUMENTS

| | | | |
|---|---|---|---|
| 0 466 534 A1 | 1/1992 | European Pat. Off. ................ | 74/543 |
| 56-56832 | 5/1981 | Japan .................................... | 264/572 |
| 2-282052 | 11/1990 | Japan .................................... | 264/572 |
| 4-29665 | 1/1992 | Japan .................................... | 74/543 |

OTHER PUBLICATIONS

S. Timoshenko and D.H. Young, *Elements of Strength of Materials*, Fifth Edition, D. Van Nostrand Company, Inc., Princeton, New Jersey, pp. 111–17, 346–56.

Wesley E. Woodson, "Control Handle Shape," *Human Factors Design Handbook: Information and Guidelines for the Design of Systems, Facilities, Equipment, and Products for Human Uses*, McCraw–Hill Book Company, Kingsport Press (1981), p. 585.

"Product Specification" sheet, Plastic Distributing Corporation, Houston, Texas, Nov. 11, 1993.

(List continued on next page.)

*Primary Examiner*—Chuck Y. Mah
*Assistant Examiner*—Donald M. Gurley
*Attorney, Agent, or Firm*—Fish & Neave; Jeffrey H. Ingerman

[57] ABSTRACT

A handle assembly having a one piece molded handle that is mounted to an extension tube and that has an integrated switch for use with a floor supported appliance is provided. The handle includes a loop-shaped grip portion, an elongated portion in which an extension tube is mounted, and a switch mounting port for mounting the switch in the handle. The handle includes a minimum number of parts and does not require fasteners for mounting it to the extension tube. A method for making the handle is also provided.

32 Claims, 7 Drawing Sheets

OTHER PUBLICATIONS

"Injection Molding: Making 'cent' of gas–assist," *Plastics World*, Feb. 1996, p. 21.

"Getting a Grip on Gas Assist," *Injection Molding*, Feb. 1996, p. 64.

"Modeling gas–assisted molding," *Injection Molding*, Feb. 1996, p. 75.

"Processing: Ten things you should know about Gas–Assist," *Injection Molding*, Feb. 1996, p. 84.

"Gas–assisted Injection Molding," *Appliance Buyer's Guide to Plastics Materials and Equipment*, Mar. 1996, p. BG–16.

HANDLE ASSEMBLY FOR FLOOR SUPPORTED APPLIANCES

BACKGROUND OF THE INVENTION

The present invention relates to a handle assembly, and particularly to an assembly having a one piece handle with an integrated appliance control switch and that is mounted to an extension tube containing electrical control wires for controlling a hand held, floor supported appliance, such as a vacuum cleaner.

A handle having a two piece clamshell construction for use with a vacuum cleaner is known. A handle having a clamshell construction facilitates the insertion of an appliance control switch into the handle and the mounting of the handle to an extension tube. However, such a two-piece handle is undesirable because one or more fasteners are usually required to hold the handle together, adding additional expense and manufacturing steps, and because fasteners may loosen during operation of the appliance.

A one piece handle is preferable to a two piece handle because a one piece handle does not require fasteners to hold it together. A simple one piece handle is an elastomeric handle that is fitted to the end of a tubular extension. Such a handle is often found on an inexpensive upright or stick type vacuum cleaner, and resembles those found on bicycle handle bars. The handle is usually mounted onto the tubular extensions by press fitting, heat shrinking, and/or with the use of adhesives. This simple handle, however, does not incorporate an electrical switch and provides a less than optimal ergonomic interface with an operator.

One piece handles with ergonomic features are known, but those handles do not provide integrated electrical switches and require fasteners for mounting the handles to their respective extension tubes. For example, the handle found on a vacuum cleaner sold under the trademark Combivac™ by Clarke®, owned by McGraw-Edison Company, of Rolling Meadows, Ill., is a one piece molded handle manufactured using foam molding technology. The handle of the Combivac™ vacuum cleaner is attached to the tubular extension with a fastener and has an electrical switch located near the top of the vacuum cleaner body, not in the handle. A similar handle is shown in Wareham et al. U.S. Pat. No. 4,707,169 in which a handgrip is fixed to a handle by a fastener using a counter sunk bolt and nut.

It is undesirable to use fasteners to mount a handle to an extension tube for a variety of reasons. First, fasteners add expense to the fabrication of a handle because the fasteners themselves cost money and because additional labor is required for their assembly. Second, fasteners, such as set screws, normally make physical contact with the extension tube. Such contact may wear away or chip the paint or metal plating that protects the extension tube from oxidation. Third, fasteners may become loose over time, decreasing the dependability and strength of the handle. And fourth, fasteners that protrude inside an extension tube may cause an electrical hazard because the fasteners could damage the electrical wires inside the tube.

Even if a one piece molded handle having an integrated switch were known, that handle would be undesirable because that handle would likely be fabricated from a solid plastic form and require subsequent labor intensive methods. For example, a solid handle with a passage for receiving an extension tube and a port for mounting an integrated switch would be molded as a solid object and then bored to form the passage and switch port. The fabrication of a bored handle, however, would be expensive because the boring process would require substantial time and labor and would waste handle material. Moreover, if the handle is molded into the form of a loop, the loop itself would likely be solid, unnecessarily consuming additional plastic that adds undesirable weight to the handle.

The nitrogen gas-assist molding technique has been used to manufacture a handle that is lightweight, but has not been used to mold a handle that is mounted to an extension tube and that has an integrated switch for use with a floor supported appliance. Nitrogen gas assist molding techniques normally include the steps of (1) injecting a molten plastic into a cavity through a fluid injection port followed by the step of (2) injecting gas into the cavity to uniformly pack, or force, the molten resin against the cavity surface. This molding process provides high dimensional stability and superior strength, and reduces the weight of the product. Conventional nitrogen gas-assist molding techniques, however, do not describe a technique for making a handle assembly having a one piece molded handle that is mounted to an extension tube and that has an integrated switch for use with a floor-supported appliance.

It would therefore be desirable to provide a handle assembly having a lightweight one piece handle that has an integrated electrical control switch and that is mounted on an extension tube for use with floor supported appliances.

It would also be desirable to provide a handle that is mountable to an extension tube without fasteners.

It would further be desirable to provide such a handle that, when mounted to a plated extension tube, does not damage the plating.

It would even further be desirable to provide such a handle that has an ergonomic grip which is not constrained by wires, switches, or clamshell design and fasteners.

It would be even more desirable to provide such a handle that is durable, easy to assemble, and includes a minimum number of parts.

It is yet further desirable to provide methods for making such a handle and handle assembly.

SUMMARY OF THE INVENTION

It is an object of the present invention to provide a handle assembly having a lightweight one piece handle that has an integrated electrical control switch and that is mounted on an extension tube for use with a floor supported appliance.

It is also an object of the present invention to provide a handle that is mountable to an extension tube without fasteners.

It is a further object of the present invention to provide such a handle that, when mounted to a plated extension tube, does not damage the plating.

It is a further object of the present invention to provide such a handle that has an ergonomic grip which is not constrained by wires, switches, or clamshell design and fasteners.

It is a further object of the present invention to provide such a handle that is durable, easy to assemble, and includes a minimum number of parts.

It is yet further object of the present invention to provide methods for making such a handle and handle assembly.

In accordance with this invention, there is provided a handle assembly having a one piece molded plastic handle that is mounted to an extension tube for use with floor supported appliances. First, the handle is formed by injecting a predetermined amount of molten plastic into a cavity the shape of a handle having a loop-shaped grip portion, an elongated portion having a passage for receiving an extension tube, a switch mounting port located in the grip portion, and a fluid injection port. The passage and the switch mounting port are in communication with each other and formed by a core section having a tip portion. Second, fluid is injected into the molten plastic through the fluid injection port to create a fluid channel inside the plastic before it completely hardens in the cavity. Third, the plastic is packed, or forced, against the cavity surface during a molding cycle. Before the plastic has completely hardened, the core section is removed and an extension tube may be mounted in the elongated portion of the handle.

Methods for making such a handle and handle assembly are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

According to the present invention, a handle assembly having a one piece molded handle that is mounted to an extension tube and that has an integrated switch for use with a floor supported appliance and a method for making such a handle assembly are provided. The handle includes a loop-shaped grip portion, an elongated portion having a passage for receiving an extension tube, and a switch mounting port for receiving an electrical control switch. The handle is preferably made from any plastic that may be injected into a mold for hardening.

The extension tube may be made from any hard material, such as steel, capable of transmitting force between the handle and the floor supported appliance. Both ends of the extension tube are preferably open so that electrical wires may pass therethrough. The extension tube is mounted in the elongated portion of the handle and preferably held firmly in place by a large frictional force between the passage and the tube surfaces. That frictional force may be increased by increasing the coefficient of friction and/or the normal force between those surfaces. The coefficient of friction can be increased by (1) roughening either the extension tube surface or the tube passage inner surface and (2) changing either surface material. Also, the normal force can be increased by "shrink-fitting" the handle onto the extension tube. Although unnecessary, the tube may be held in place by other techniques, including providing complementary projections and depressions on the tube and passage surfaces, and using fasteners.

The proximal end of the elongated portion of the handle is integrally connected to and extends in a grip portion, which is in the shape of a closed loop that includes a segment that may be hand held during operation of the appliance. The closed loop shape improves the flexural rigidity and impact strength of the handle. A channel is formed inside the grip portion, and may be separated from the passage in the elongated portion of the handle by a barrier.

The longitudinal axis of the hand held segment of the grip portion forms a grip angle in the operating condition with the plane of the floor that preferably maximizes comfort and minimizes finger, wrist, and forearm fatigue. That grip angle normally fluctuates about a fixed value during operation of the appliance, such as when a vacuum cleaner is pushed and pulled. That fixed value depends on the physical proportions of the operator, such as height and arm length, and the individual style of pushing and pulling employed by that operator. However, it has been learned that the fixed angle for a "typical" operator (having relatively average physical proportions) is between about 10° and about 20° during normal use, and more preferably, about 14°. In this way, the power required by the operator of said appliance is minimally optimized for pushing, pulling, and maneuvering the appliance. The length of the extension tube and the shape of the handle should also be ergonomically designed to complement, and work in conjunction with, the preferred grip angle.

The handle also includes a switch mounting port that is formed in the grip portion and preferably substantially opposite from the hand held segment. The port is in communication with the tube passage and preferably located in a proximal section of the elongated portion. Most preferably, the longitudinal axis of the mounting port is substantially coaxial with the longitudinal axis of the tube passage. Also, the switch mounting port is preferably located on the inner surface of the grip portion that faces inwardly toward the center of the loop. That location protects the switch from accidentally applied forces.

An internal wiring harness provides electrical connections between the appliance, located at the distal end of the extension tube, and the handle-mounted switch, located at the proximal end of the tube. The internal wiring harness preferably extends inside the tube from the integral switch to the distal end of the extension tube.

Preferably, the handle includes an integral power cord hook that extends from the underside of the distal end of the elongated portion of the handle around which a power cord may be supported when the appliance is not being used. The length of the power cord hook is the distance between the longitudinal axis of the elongated portion and the lower tip of the cord hook. Preferably, the length of the cord hook is sufficient that, if the handle assembly is dropped to the floor, the cord hook will prevent the grip portion from striking the floor.

A method for making a one piece molded handle, for use with a handle assembly in accordance with the present invention, is also provided.

In a first step of that method, molten plastic is injected into a handle-shaped cavity of a mold. The cavity shape is substantially identical to the handle described above, including a grip portion, an elongated portion, a switch mounting port, and a fluid injection port. Both the switch mounting port and the passage of the cavity for receiving the extension tube are formed by the outer surface of the core section of the mold.

If air, or any other gas, occupies the cavity before the molten plastic is injected into it, the method may also include allowing the gas to escape the cavity through one or more vents during injection. By allowing the gas to escape from the cavity during injection, back-pressure that may arise from that gas is eliminated. Alternatively, the gas pressure in the cavity may be reduced from the cavity by applying a vacuum to the cavity before injecting the plastic.

In a second step of the method, a fluid is injected into the molten plastic that has already been injected into the cavity to create a fluid channel inside the plastic before it completely hardens. Preferably, the fluid is injected into the molten plastic through one or more fluid injection ports, which may be located anywhere at the cavity surface that allows the injected plastic and fluid to flow easily therefrom. A preferable fluid for use with the present invention is gas, especially nitrogen gas. Another fluid that may be used in accordance with the present invention is molten foam that upon cooling forms a foam core within the molded handle.

In a third step of the method, the molten plastic is forced against the cavity surface by fluid pressure for a predetermined time period to complete a molding cycle. The fluid pressure may be controlled to compensate for shrinkage of the plastic during hardening to substantially eliminate undesirable structural stresses that are normally associated with molded parts. When the injected fluid is a gas or liquid, rather than a foam plastic, it may be vented from the fluid channel after the packing step, preferably through one or more of the fluid injection ports. After venting, a port plug may be inserted into these ports to seal the vented channel.

The method may also include the step of mounting the handle to an extension tube. The mounting step includes retracting the core section from the cavity before the elongated section is completely hardened to form a passage and inserting the extension tube into that passage. The core section is preferably linear and rigid so that retraction is unhindered. Also, the core section must have a portion, preferably at the tip of the core section, for forming a suitable switch mounting port. That tip portion may be the tip of the core section itself or it may be the tip of an inner sleeve that extends from inside the core section. The extension tube may be inserted into the passage before the plastic completely hardens to allow the elongated portion to "shrink-fit" around the tube.

The method according to the present invention may further include (1) introducing an internal wiring harness into one end of the extension tube until a first end of the harness is near the switch mounting port and the other end of the harness is near the other end of the tube, (2) connecting the first end of the harness to the switch, and (3) mounting the switch in the switch mounting port. The introduction of the wiring harness into the extension tube is facilitated when the switch mounting port and passage are substantially collinear.

A preferred embodiment of the invention will now be described with reference to FIGS. 1–7. One piece handle 100 includes loop-shaped grip portion 130, elongated portion 160, and switch mounting port 190. Handle 100 may also have fluid injection port 195. Handle 100 preferably comprises a plastic. As used herein, a plastic is any flowable material that may be injected into a mold for hardening. Examples of plastics that may be used in accordance with the present invention to form handle 100 include thermoplastics, including acrylonitrile butadiene styrene (i.e., ABS). A preferred thermoplastic that may be used to form handle 100 may be a copolymer polypropylene, such as that sold by the Plastic Distributing Corporation, of Houston, Tex., as Type 31-0820 Natural CPPP.

Extension tube 200 may be made from any hard material including, for example, metals, metal alloys, and plastics. Both ends of extension tube 200 are preferably open for allowing electrical wires of internal wiring harness 300 to pass therethrough. Preferably, extension tube 200 is made from steel. Tube cross-sections may be any shape, including polygonal (e.g., triangular, rectangular, etc.) and ellipsoidal (e.g., circular). When extension tube 200 is made of metal, it is preferably plated with a protective coating, such as nickel.

Figure 1:
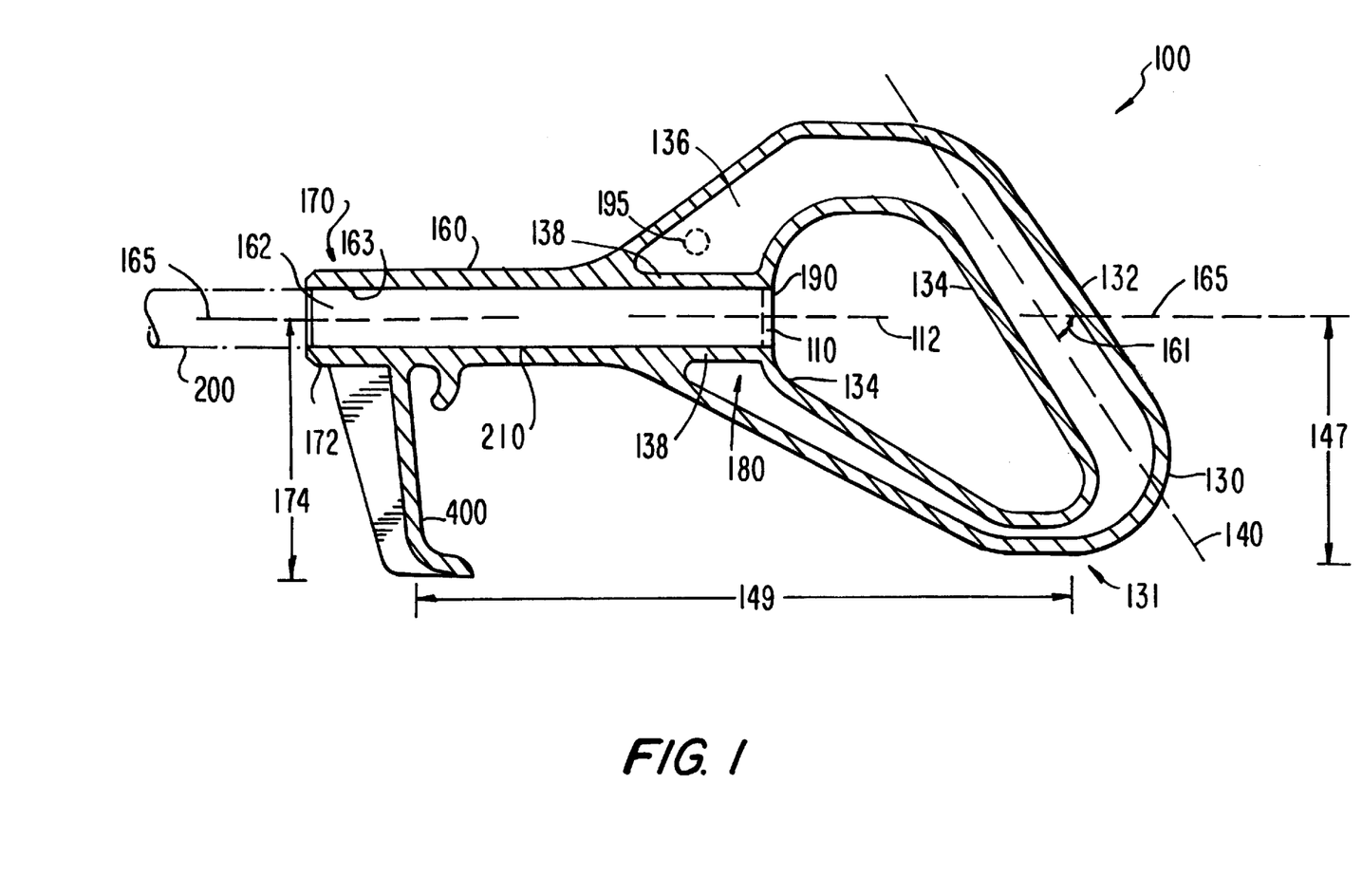
FIG. 1 is a cross-sectional view of a handle according to the present invention.

As shown in FIG. 1, extension tube 200 is mounted in elongated portion 160 of handle 100 in tube passage 162. Preferably, passage 162 extends longitudinally within portion 160, which is formed at distal end 170 of handle 100. The cross-sectional shape of passage 162 is preferably substantially similar to the cross-sectional shape of tube 200 for receiving tube 200.

Extension tube 200 is preferably held firmly in tube passage 162 by a frictional force that exists between passage surface 163 and extension tube surface 210. The magnitude of the frictional force is known to be proportional to the coefficient of friction and the normal force between the two surfaces. Therefore, it is possible to increase the frictional force between tube surface 210 and passage surface 163 by increasing the coefficient of friction and/or the normal force between the surfaces. The coefficient of friction can be increased (1) by roughening either tube surface 210 or passage surface 163, or (2) by changing the materials forming the tube or passage surfaces. Tube surface 210 can be roughened, for example, by chemical etching, mechanical scratching, or disposing onto the surface a coarse material, such as a paint with granules.

A large frictional force between surfaces 163 and 210 may also be obtained by increasing the normal force between them by "shrink-fitting" passage 162 on extension tube 200. Because thermoplastic parts normally shrink in size as they cool after being removed from a mold, the cross-sectional area of passage 162 perpendicular to longitudinal axis 165 decreases in size during the cooling, or hardening process. Therefore, if tube 200 is placed in passage 162 before elongated portion 160 of handle 100 has completely hardened, additional cooling of portion 160 will cause portions of passage surface 163 adjacent to convex portions of tube surface 210 to shrink toward those convex portions of tube surface 210, increasing the normal force, and thereby the frictional force, between the surfaces.

Figure 3:
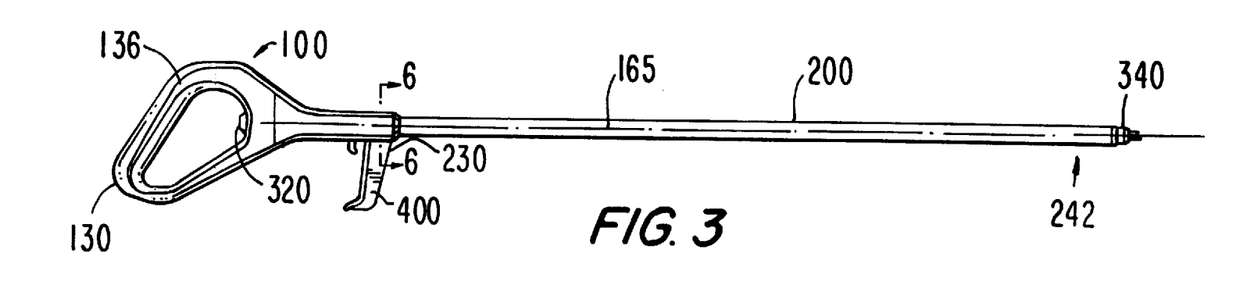
FIG. 3 is a side cross-sectional view of the extension tube and handle shown in FIGS. 2.
Figure 4:
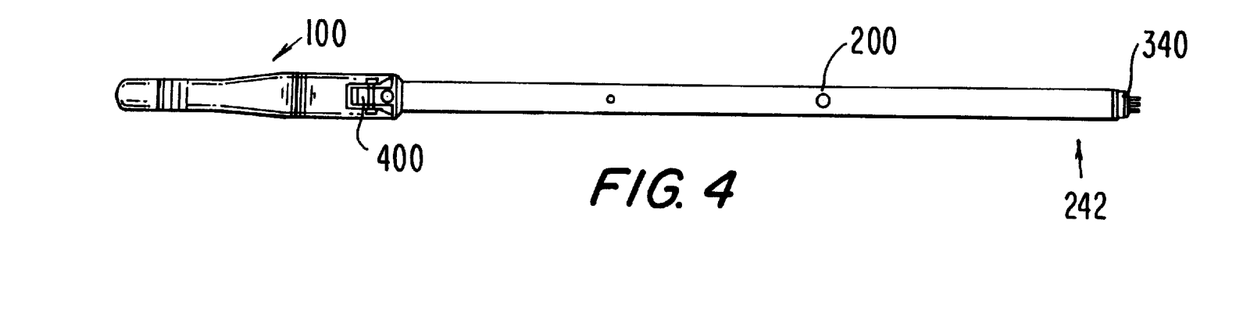
FIG. 4 is a bottom view of the extension tube and handle shown in FIGS. 2 and 3.
Figure 6:
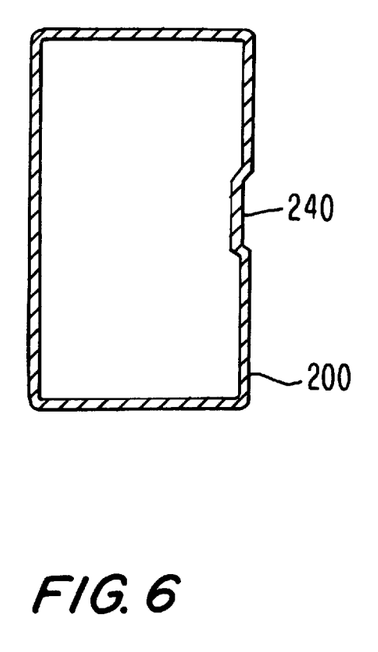
FIG. 6 is a cross-sectional view of an extension tube taken from line 6—6 of FIG. 3.

Of course, tube 200 may be held tightly in passage 162 by other techniques as well. For example, complementary projections and depressions may be provided on surfaces 163 and 210 for engaging each other. Also, at least one fastener may be used to hold tube 200 in passage 162. One type of fastener that may be used to hold tube 200 in passage 162, as shown in FIGS. 3 and 6, is set screw 230 for pressing against tube 200. As shown in FIG. 6, tube 200 may be constructed to have indentation 240 on outer surface 210 for receiving set screw 230. Also, surfaces 163 and 210 may be held together by applying a bonding agent between them.

Handle 100 also includes grip portion 130. Grip portion 130 is in the shape of a closed loop and preferably includes segment 132 that may be hand held during operation of the associated floor supported appliance. The impact strength and flexural rigidity of a grip portion having a closed loop shape is superior to elongated handles as normally found on appliances today. Flexural rigidity is a measure of an object's resistance to bending and is proportional to the object's (1) moment of inertia about an axis and (2) material stiffness. The superior flexural rigidity of a closed loop shape grip portion arises because the moment of inertia of that shape about the loop's preferred axis is relatively large when compared to substantially linear or semi-circular handle shapes. Proximal end 180 of elongated portion 160 of handle 100 is integrally connected to and extends in grip portion 130. Channel 136 is formed inside grip portion 130, and may be separated from passage 162 by barrier 138.

Figure 5:
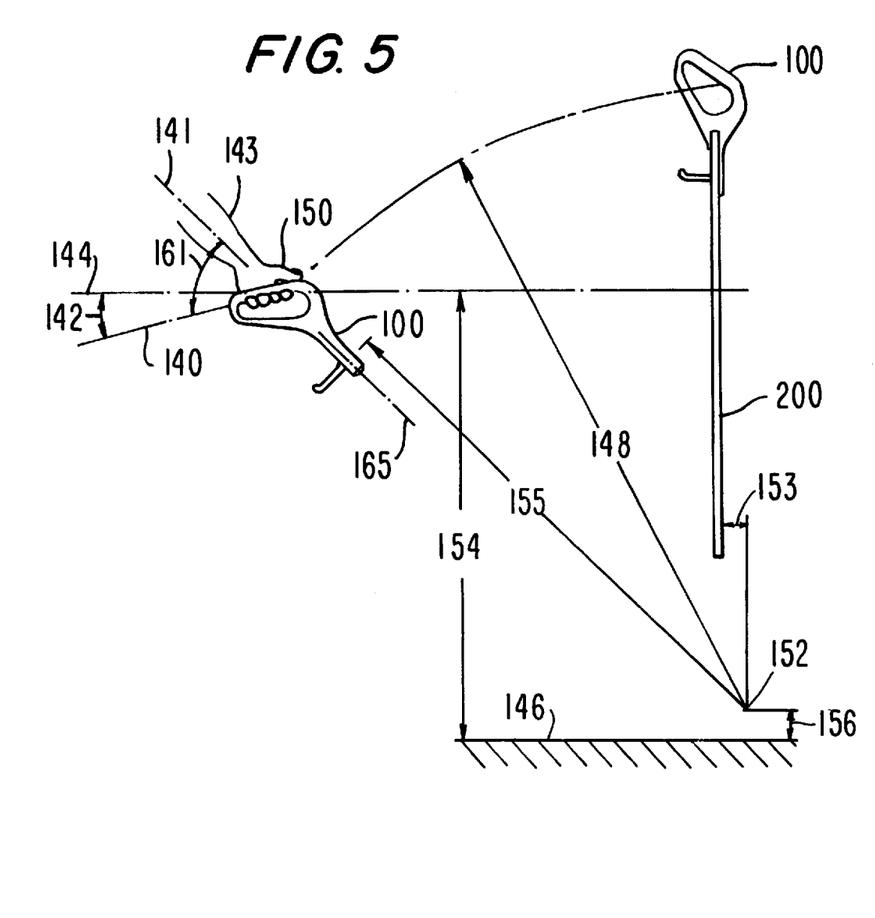
FIG. 5 is a side view of the handle and extension tube shown in FIGS. 2–4 in two different orientations.

Longitudinal axis 140 of segment 132 preferably has an ergonomic direction. In order to maximize comfort and minimize finger, wrist, and forearm fatigue, it has been learned through extensive testing and model iteration that grip angle 142 formed between longitudinal axis 140 and a plane 144 parallel to floor 146 is preferably between about 10° and about 20° during normal use. More preferably, grip angle 142 is about 14° during operation of the floor supported appliance to ensure that longitudinal axis 141 of a "typical" operator's forearm 143 remains substantially coaxial with longitudinal axis 165 of extension tube 200. In this way, power provided by the operator is optimally used for pushing, pulling, and maneuvering the appliance.

In accordance with the principles of the present invention, FIG. 5 shows handle 100 mounted to extension tube 200 having an ergonomic geometry. That geometry complies with an industry standard handle height 154 of about 31.5 inches and optimal grip angle 142 of about 14°. The industry standard handle height is measured from the floor to the center of grip portion 132 of handle 100. As shown in FIG. 5, longitudinal axis 141 of operator forearm 143 is preferably made substantially parallel to tube axis 165 by designing handle 100 so that longitudinal axis 165 forms angle 161 with longitudinal axis 140 that is between about 50° and about 70°, and preferably about 57°. One skilled in the art, however, will appreciate that the particular value of angle 161 may be adjusted in any way that provides the desired grip angle 142, as described above.

In addition to orienting segment 132 to provide grip angle 142, the handle-shape may be made ergonomic by considering how the operator of the floor supported appliance grips the handle during use. For example, "pistol-grip" handles should preferably taper toward the bottom because of the foreshortening of an operator's fingers. Also, in order to provide maximum grip strength and security, the cross section of segment 132 perpendicular to longitudinal axis 140 is preferably round or oval to accommodate a variety of hand sizes. Segment 132 may also be textured in a way which is comfortable to the human hand when gripped during operation of the floor supported appliance while minimizing slippage. Examples of textured surfaces are knurled or serrated surfaces.

Handle 100 also includes switch mounting port 110. Port 110 has longitudinal axis 112 and is formed in a section of grip portion 130 at inner surface 134 and preferably substantially opposite from segment 132. Inner surface 134 faces inward toward the center of the loop. Port 110 is in communication with elongated passage 162 and preferably located at proximal end 180 of portion 160 in a distal section of grip portion 130. Most preferably, port axis 112 is substantially coaxial with passage axis 165. Also, for reasons discussed below, the cross-sectional dimensions of port 110 are preferably equal to or less than the cross-sectional dimensions of passage 162.

Figure 2:
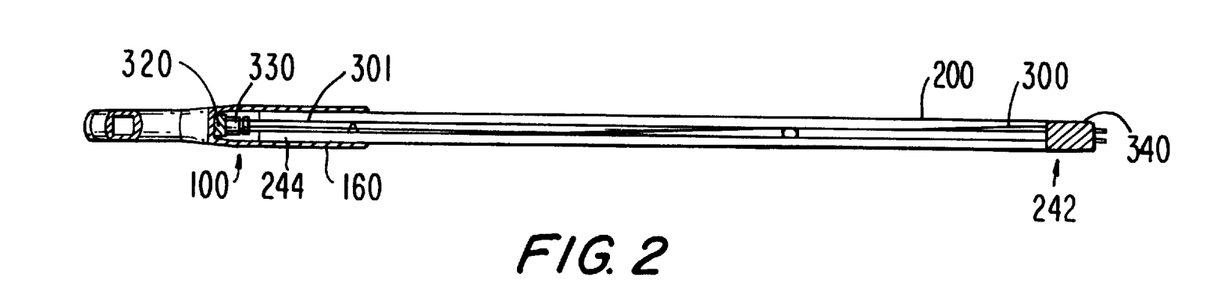
FIG. 2 is a top cross-sectional view of an extension tube mounted to the handle shown in FIGS. 1.

Internal wiring harness 300 provides electrical connections between a floor supported appliance (e.g., a vacuum cleaner), located at distal end 240 of extension tube 200, and switch 320 of handle 100. As shown in FIG. 2, one end of internal wiring harness 300 is preferably connected to electrical switch 320 in switch mounting port 110 of handle 100 using any conventional connecting means 330. Internal wiring harness 300 extends inside tube 200 from switch mounting port 110 to distal end 240 of extension tube 200 for one or more electrical connections to a floor supported appliance via any conventional connecting means, such as connector plug 340. Because the plastic that forms handle 100 may not necessarily be a "V" rated material (i.e., a material that has passed a conventional "vertical burn test"), the connecting means used with internal wiring harness 300 are preferably insulated to satisfy electrical safety requirements. (See, e.g., the requirements specified by Underwriters Laboratories, Inc., in UL 1017, §4.1.1.5(c) for Vacuum cleaners, Blower Cleaners, and Household Floor Finishing Machines.)

Handle 100 also preferably includes power cord hook 400 around which a power cord may be supported when the appliance is not being used. Preferably, cord hook 400 may be integrally formed as part of the handle, or attached to the handle by one or more fasteners (not shown). As used herein, the underside is the side of the handle which is directed substantially downward during operation of the floor supported appliance. Preferably, cord hook 400 extends downward from underside 172 of elongated portion 160. As shown in FIG. 1, the minimum cord hook length 174 should be sufficient to protect bottom segment 131 of grip portion 130 when handle 100 is dropped on floor 146 or otherwise abused. Furthermore, as shown in FIG. 5, minimum cord hook length 174 depends on a variety of dimensional constraints. For example, when distance of closest approach 153 has a value of zero and vertical distance 156 has a value equal to grip drop length 147, hook length 174 must be greater than drop length 147 (radial distance 148 is immaterial). In another simple case, vertical distance 156 and distance of closest approach 153 are both substantially zero. In that case, the minimum value of cord hook length 174 is equal to drop length 147 multiplied by the ratio of axial hook distance 155 to radial distance 148. More complicated expressions may be obtained when both vertical distance 156 and distance of closest approach 153 have substantially non-zero values.

Figure 8:
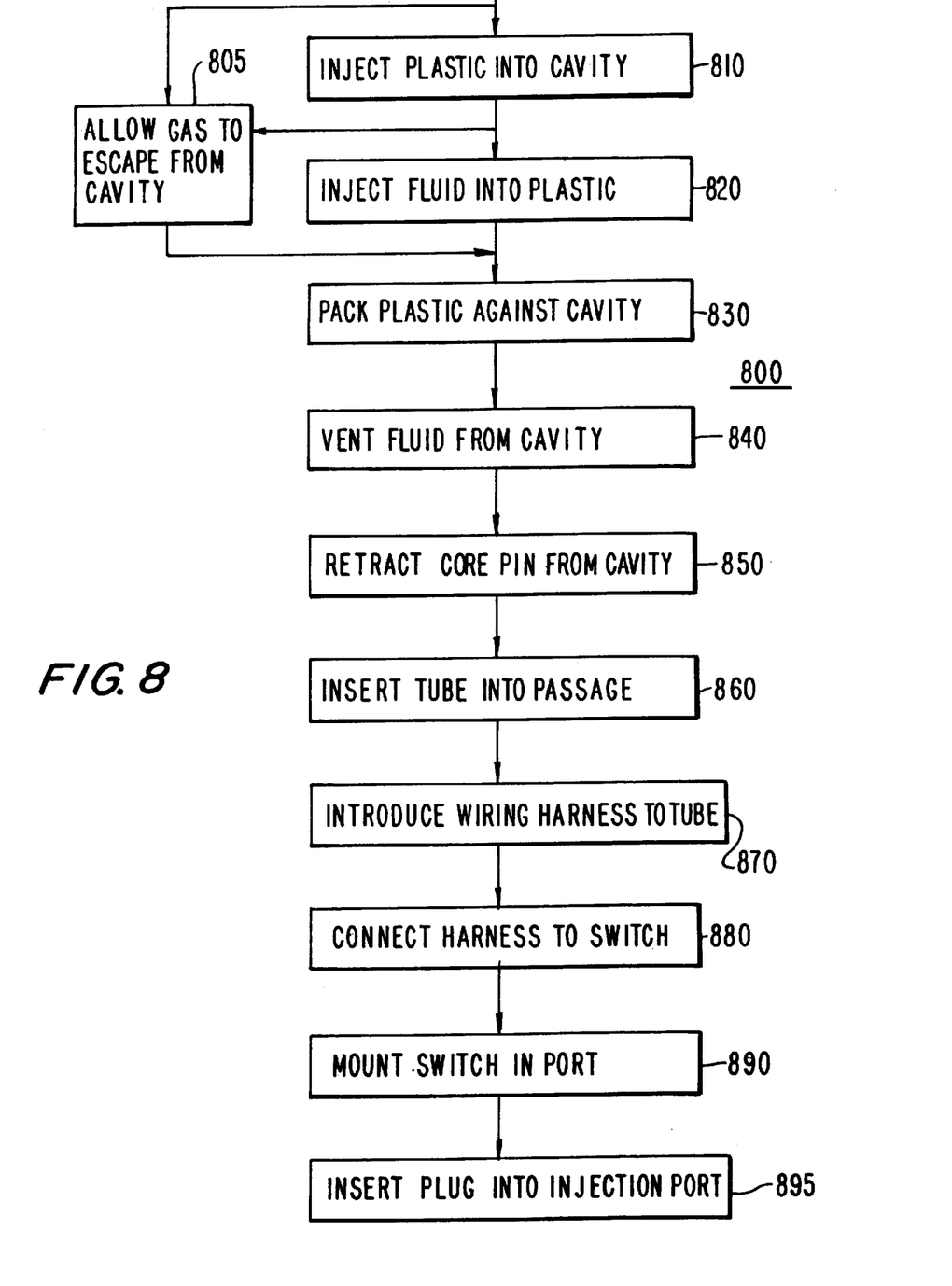
FIG. 8 is a flow diagram of a method of making a handle in accordance with the present invention.
Figure 9:
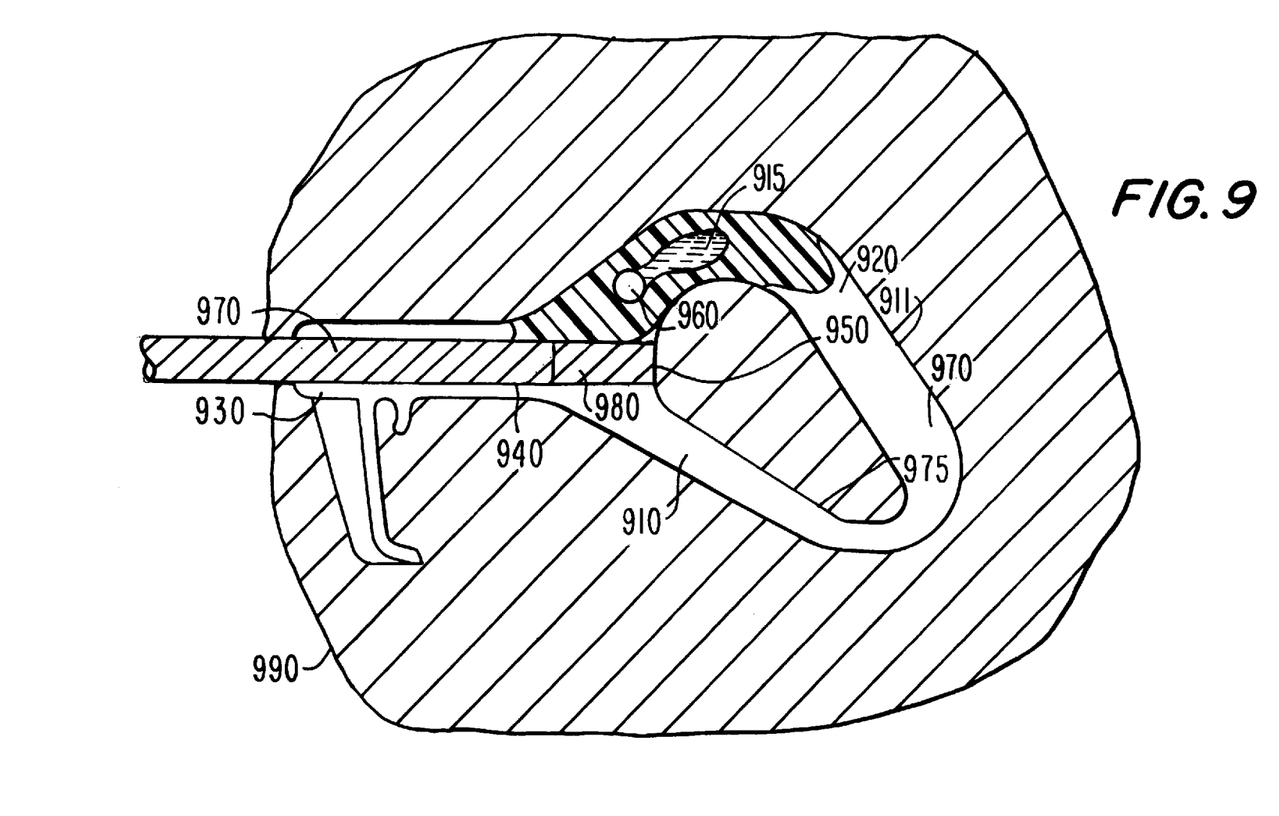
FIG. 9 is a cross-sectional view of a mold for making handles according to the present invention.

A method for making one piece handles and handle assemblies according to the present invention is described below with reference to FIGS. 8 and 9.

Method 800 is for making a one piece molded handle having an integrated switch and mounted to an extension tube for use with a floor supported appliance.

In a first step 810, a predetermined amount of molten plastic 905 is injected into cavity 910 having the shape of a handle. The handle shape has (1) loop-shaped grip portion 920, (2) elongated portion 930 that has passage 940 for receiving an extension tube, and (3) switch mounting port 950 that is located in grip portion 920 and in communication with passage 940, and (4) fluid injection port 960. Both the switch mounting port and the passage are formed by the surface of a core section that has a longitudinal axis.

If a gas, such as air, occupies cavity 910 of mold 990 before step 810 takes place, method 800 may also include, in a step 805, allowing the gas to escape cavity 920 through one or more vents 970 during steps 810 and 820 (see, below). By allowing the gas to escape from the cavity, back-pressure that may impede the flow of plastic is eliminated. Alternatively, the gas occupying cavity 910 before step 810 may be removed by applying a vacuum to cavity 910 at vent 970 before step 810, thereby reducing the gas pressure in the cavity.

In a second step 820, fluid 915 is injected into predetermined amount of plastic 905 in cavity 910 to create fluid channel 925 inside plastic 905 before it completely hardens in cavity 910. Preferably, fluid 915 is injected into plastic 905 through fluid injection port 960, which may be located anywhere at cavity 910 surface, especially at a place that allows injected plastic 905 and fluid 915 to flow easily, such as in grip portion 920 of handle-shaped cavity 910.

As used herein, a fluid is any flowable material, including, for example, gases and liquids. The injection of gas into a molten plastic combines the advantages of conventional injection molding (forming detailed solid parts) and blow molding (forming simple hollow parts), but differs from both by forming detailed hollow parts. Parts formed from gas-assisted technology are preferred because they are lightweight, strong, and formed using a minimum amount of plastic.

A preferable fluid for use with the present invention is nitrogen gas. Nitrogen gas-assisted molding techniques are known to provide hollow molded parts that have reduced differential stress throughout, improved dimensional stability, and minimal sink marks. Also, wall thicknesses can be varied and support brackets may be molded into the housing as well. The injected fluid has a fluid pressure and is injected at a particular flow rate through the fluid injection port. Another fluid that may be used in accordance with the present invention is molten foam that upon cooling forms a foam core within the molded handle. Other fluids that may be used in accordance with the present invention include flowable solids, such as saw dust and glass beads, and solid solutions (i.e, solids immersed in a liquid).

In a step 830, plastic 905 is forced with fluid pressure against the cavity surface 911 for a predetermined time period to complete a molding cycle. As used herein, a molding cycle is the period of time required between similar events during the molding process, that is, the "total machine cycle time." During step 830, fluid pressure may be controlled to compensate for shrinkage of plastic 905 during hardening to substantially eliminate undesirable structural stresses that are normally associated with molded parts. Also, when gas is used to pack molten plastic 905 in cavity 910, the molding cycle may be shortened because of the relatively thin walls of the part, increasing manufacturing efficiency and reducing associated manufacturing costs. After packing, injected fluid 905 may be vented from cavity 910 in a step 840. Preferably, fluid 915 is vented from fluid channel 925 through fluid injection port 960.

Method 800 may also include mounting handle 100 to extension tube 200 including, in a step 850, retracting core section 970 from cavity 910 to form passage 940 with a longitudinal axis, and in a step 860, inserting a proximal end 244 of extension tube 200 into passage 940. Core section 970 is preferably linear, rigid, and tapered to facilitate retraction of core section 970 from cavity 910. Also, core section 970 should have tip portion 980 for forming switch mounting port 950 having a suitable shape for receiving switch 320. Tip portion 980 may be formed from the end of an internal post that extends from one end of core section 970. Preferably, tube 200 is inserted into passage 940 before plastic 905 completely hardens to allow passage 930 to "shrink-fit" around tube 200. Most preferably, tube 200 is inserted into passage 940 within a time period of about two molding cycles. When using a copolymer polypropylene plastic as a fluid in accordance with the principles of this invention, one molding cycle may have a duration of between about 15 and about 90 seconds.

Figure 7:
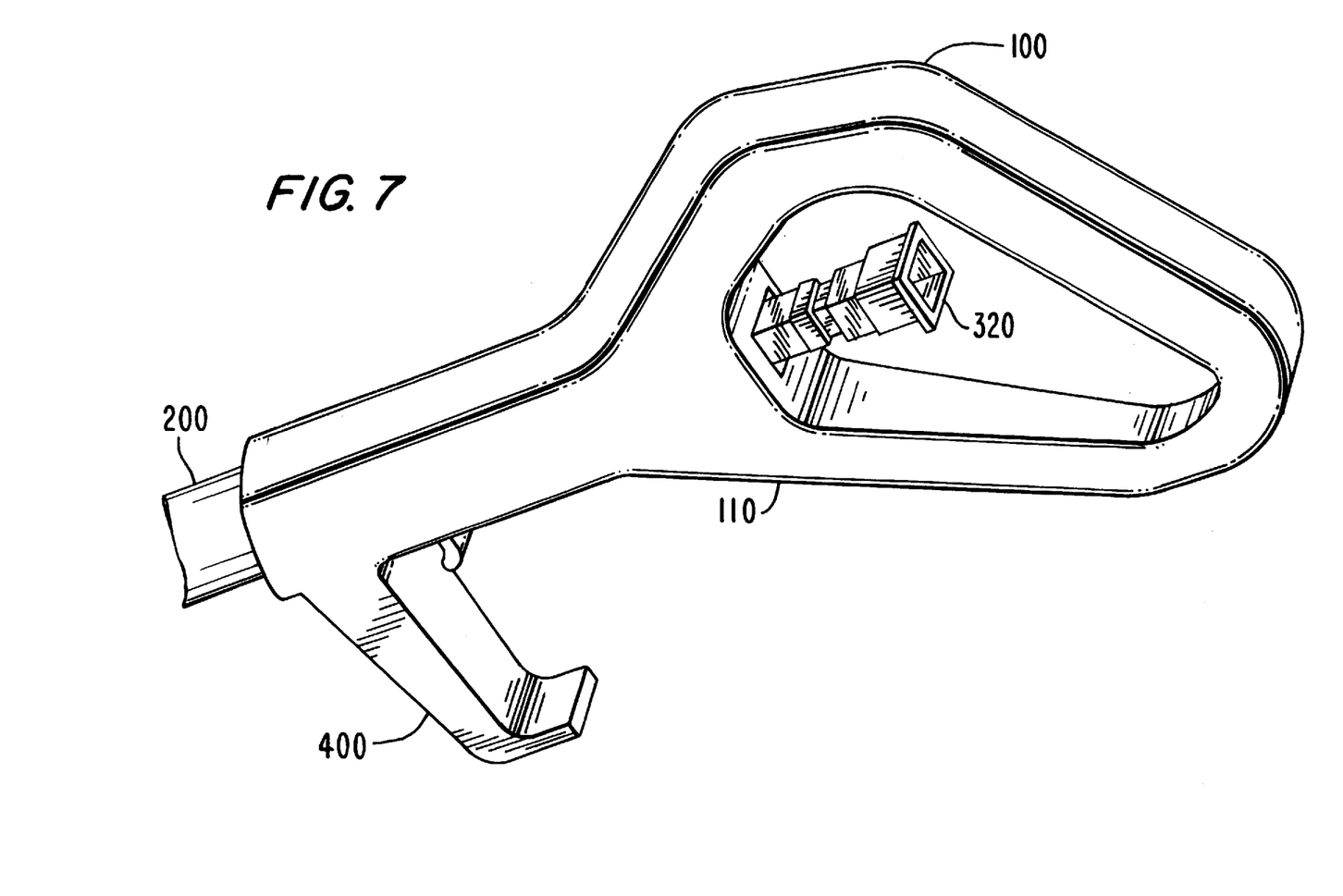
FIG. 7 is a perspective view of an embodiment of the handle of the present invention after the internal harness is connected to a switch, but before the switch is mounted in its port.

Method 800 may further include, in a step 870, introducing internal wiring harness 300 into distal end 242 of extension tube 200 until first end 301 of harness 300 is near switch mounting port 950 and the other end of harness 300 is near proximal end of tube 200; in a step 880, connecting first end 301 of harness 300 to switch 320; and in a step 890, mounting switch 320 in switch mounting port 950. As shown in FIG. 7, switch 320 may easily be connected to internal wiring harness 300 before switch 320 is inserted into switch mounting port 950. When the relationship between port longitudinal axis 112 and passage longitudinal axis 165 is substantially collinear, introduction of wiring harness 300 through extension tube 200 to switch mounting port 110 is facilitated.

One skilled in the art will understand that while method 800 preferably includes, in a step 840, venting injected fluid 915 from channel 136, most preferably through fluid injection port 195, that step may occur at anytime after at least partial cooling of the plastic. After venting, in a step 895, a port plug (not shown) that has a shape substantially similar to fluid injection port 195 is preferably inserted into port 195 to seal channel 136. The plug prevents foreign material from entering the channel and provides an atheistically pleasing finish.

Thus it is seen that a handle assembly having an ergonomic, lightweight, one piece handle that may be mounted to an extension tube and that has an integrated switch for use with floor supported appliances is provided. The handle assembly is durable, easy to assemble, and includes a minimum number of parts. The handle includes a loop-shaped grip portion, an elongated portion for mounting an extension tube, and a switch mounting port in said grip portion for mounting a switch. One skilled in the art will appreciate that the present invention can be practiced by other than the described embodiments, which are presented for purposes of illustration and not of limitation, and the present invention is limited only by the claims which follow.

What is claimed is:

1. A handle assembly for use with a floor supported appliance including a one piece molded handle and an extension tube to which said handle is mounted, said handle being formed by a method comprising the steps of:

injecting a predetermined amount of molten plastic into a mold having a cavity in which is located a core section having a tip portion, said cavity having the shape of said handle and a surface area, said handle comprising:
a loop-shaped grip portion,
an elongated portion having a passage for receiving said extension tube, said passage having a surface, a longitudinal axis, and being defined by said core section,
a switch mounting port located in said grip portion in communication with said passage, said switch mounting port being defined by said tip portion, and
a fluid injection port, said switch mounting port being adapted to receive a switch;

injecting a fluid having a fluid pressure into said predetermined amount of plastic at a flow rate through said fluid injection port, thereby forcing said molten plastic to flow in said cavity to create a fluid channel inside said plastic before said plastic completely hardens in said cavity, at least a portion of said channel being in said grip portion; and packing said plastic against said cavity surface area with fluid pressure for a time period less than a molding cycle.

2. The handle assembly of claim 1 wherein said passage longitudinal axis passes through said mounting port.

3. The handle assembly of claim 1 wherein said plastic is selected from the group consisting of at least copolymer polypropylene and ABS.

4. The handle assembly of claim 1 wherein said switch mounting port is located at an inner surface of said grip portion.

5. The handle assembly of claim 1 wherein said passage is shrink-fitted to said extension tube.

6. The handle assembly of claim 1 wherein said extension tube is held in said passage by a frictional force between said passage surface and a surface of said extension tube.

7. The handle assembly of claim 6 wherein said extension tube surface is roughened to increase said frictional force.

8. The handle assembly of claim 1 wherein said surface of said passage has a shape that interlocks with said extension tube surface.

9. The handle assembly of claim 1 wherein said extension tube is metal.

10. The handle assembly of claim 1 wherein said extension tube has a longitudinal axis and a cross-section perpendicular to said tube longitudinal axis and wherein said switch has a portion that is mounted inside said port of said handle grip, said tube cross-section being at least as large as said portion of said switch.

11. The handle assembly of claim 1 wherein said handle further comprises a power cord hook.

12. The handle assembly of claim 11 wherein said cord hook extends from an underside of said elongated portion, said cord hook having a length sufficient to protect said handle grip when said handle assembly is dropped.

13. The handle assembly of claim 1 wherein said grip portion comprises a segment having a second longitudinal axis that is in a direction that minimizes hand fatigue and stress and optimizes available power provided by a user of the appliance for pushing, pulling, and maneuvering said appliance.

14. The handle assembly of claim 13 wherein said second longitudinal axis forms an angle with said first longitudinal axis having a range between about 50° and about 70°.

15. The handle assembly of claim 14 wherein said angle is about 57°.

16. The handle assembly of claim 1 further comprising:
an internal wiring harness mounted inside said extension tube, said harness comprising at least one wire for connecting said mounted switch to the floor supported appliance.

17. The handle assembly of claim 16 wherein said harness further comprises a switch connector for connecting said at least one wire to said switch.

18. The handle assembly of claim 16 wherein said harness further comprises a switch connector for connecting said at least one wire to said appliance.

19. A method for making a one piece molded handle mounted to an extension tube for use with a floor supported appliance, said method comprising the steps of:
injecting a predetermined amount of molten plastic into a cavity the shape of a handle, said cavity having a surface area, said handle comprising:
a loop-shaped grip portion,
an elongated portion having a passage for receiving said extension tube,
a switch mounting port located in said grip portion in communication with said passage, said passage and said switch mounting port being formed by a core section having a tip portion and a longitudinal axis, and
a fluid injection port;
injecting a fluid having a fluid pressure
into said plastic at a flow rate through said fluid injection port, thereby forcing said molten plastic to flow in said cavity to create a fluid channel inside said plastic before said plastic completely hardens in said cavity, at least a portion of said channel being in said grip portion;
packing said plastic against said cavity surface area with fluid pressure for a time period less than a molding cycle; and
mounting said handle to said tube, said step of mounting comprising the steps of:
retracting said core section from said cavity to form said passage having a longitudinal axis, and
inserting a first end of an extension tube into said passage.

20. The method of claim 19 wherein said step of packing is performed by controlling said fluid pressure.

21. The method of claim 19 wherein said step of inserting the first end of the extension tube is performed before said plastic completely hardens so that said passage shrink-fits onto said extension tube during hardening of said plastic.

22. The method of claim 19 wherein said step of mounting is performed before said plastic completely hardens.

23. The method of claim 19 wherein said step of packing is performed in a molding cycle having a duration of between about 15 seconds and about 90 seconds.

24. The method of claim 19 further comprising the step of:
introducing an internal wiring harness into said extension tube so that a first end of said harness is near said switch mounting port and the second end of said harness is near a second end of said extension tube;
connecting said first end of said harness to a switch; and
mounting said switch in said switch mounting port.

25. The method of claim 19 wherein said step of injecting fluid comprises the step of injecting a fluid selected from the group consisting gas, liquid, foam, solid solutions, and flowable solids.

26. The method of claim 19 wherein said step of injecting plastic comprises the step of injecting copolymer polypropylene.

27. The method of claim 19 wherein said cavity has gas in said cavity before said step of injecting plastic and at least one vent, said method further comprising the step of:
allowing said gas to escape through said at least one vent during said steps of injecting plastic and injecting fluid to eliminate back-pressure from said gas in said cavity and allow said plastic to flow throughout said cavity.

28. The method of claim 19 wherein said cavity has gas having a gas pressure in said cavity before said step of injecting plastic, said method further comprising the step of:
reducing said gas pressure in said cavity before said step of injecting plastic to eliminate back-pressure from said gas in said cavity and allow said plastic to flow throughout said cavity.

29. The method of claim 19 further comprising venting said injected fluid from said cavity.

30. The method of claim 29 wherein said step of venting vents said fluid through said fluid injection port.

31. A one piece molded handle mounted to an extension tube for use with a floor supported appliance produced according to the method of claim 19.

32. A handle assembly having a one piece molded handle for use with a floor supported appliance, said handle being mounted to an extension tube and having an integrated electrical control switch, said handle comprising:

a loop-shaped grip portion, said grip portion being at least partially hollow;

an elongated portion having a longitudinal axis and a passage for receiving said extension tube that is connected to the floor supported appliance; and a switch mounting port for mounting said switch to said grip portion, said mounting port being in communication with said passage.

\* \* \* \* \*

UNITED STATES PATENT AND TRADEMARK OFFICE
CERTIFICATE OF CORRECTION

PATENT NO. : 5,887,315
DATED : March 30, 1999
INVENTOR(S) : Carla B. Rogers

It is certified that error appears in the above-indentified patent and that said Letters Patent is hereby corrected as shown below:

On the title page: Item [56]

References Cited, Other Publications, "Uses," should be --Use,--.

Column 11, line 59, "a switch" should be --an appliance--.

Signed and Sealed this

Twenty-third Day of May, 2000

Attest:

Q. TODD DICKINSON

*Attesting Officer*    *Director of Patents and Trademarks*